United States Patent [19]

Torbov et al.

[11] Patent Number: 4,555,996

[45] Date of Patent: Dec. 3, 1985

[54] METHOD FOR REDUCTION OF SULFUR PRODUCTS IN THE EXHAUST GASES OF A COMBUSTION CHAMBER

[75] Inventors: Tsvetan I. Torbov, Sunnyvale; George R. Offen, Woodside, both of Calif.; Stuart K. Denike, Scottsdale, Ariz.

[73] Assignee: Acurex Corp., Mountain View, Calif.

[21] Appl. No.: 628,456

[22] Filed: Jul. 6, 1984

[51] Int. Cl.⁴ .................. F23J 11/00; F23J 15/00
[52] U.S. Cl. ................................. 110/345; 431/4
[58] Field of Search .............. 110/345, 343, 344; 44/15 R; 431/4

[56] References Cited

U.S. PATENT DOCUMENTS

| 4,245,573 | 1/1981 | Dixit et al. .................. 110/345 X |
| 4,440,100 | 4/1984 | Michelfelder et al. ........ 110/345 X |
| 4,444,128 | 4/1984 | Munro ............................ 110/345 |
| 4,461,224 | 7/1984 | Michelfelder et al. ......... 110/345 |

Primary Examiner—Edward G. Favors
Attorney, Agent, or Firm—Flehr, Hohbach, Test, Albritton & Herbert

[57] ABSTRACT

A method is provided for reducing the sulfur content of gas from a combustion installation comprising the step of injecting outside of the combustion region an aqueous spray composition containing an additive which, when dried, reacts with sulfur-containing gases.

3 Claims, 6 Drawing Figures

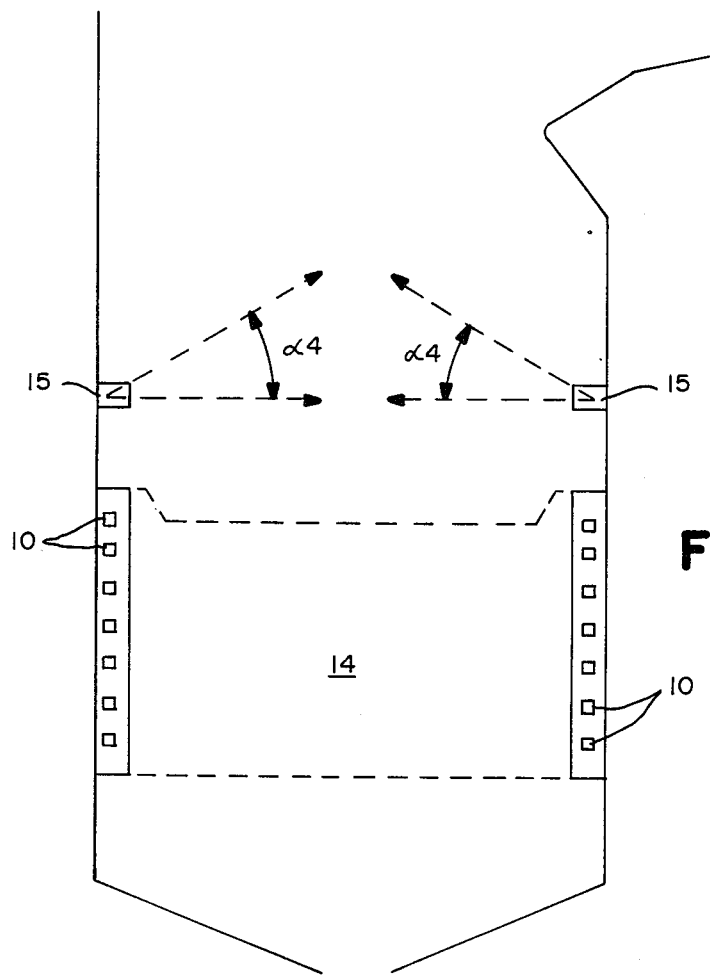
FIG.—1A
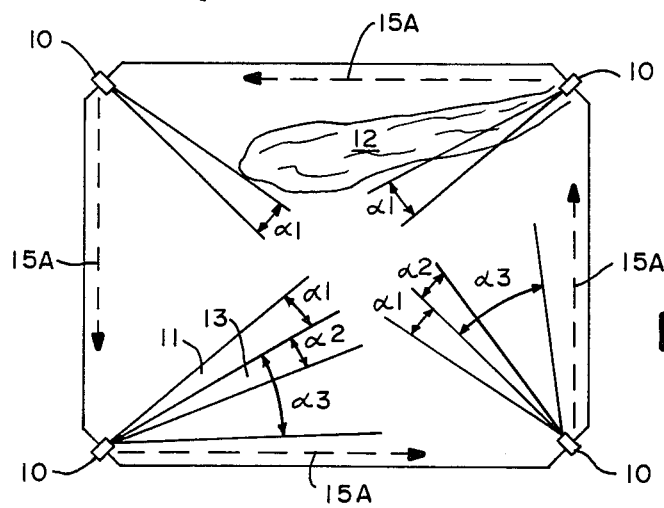
FIG.—1B

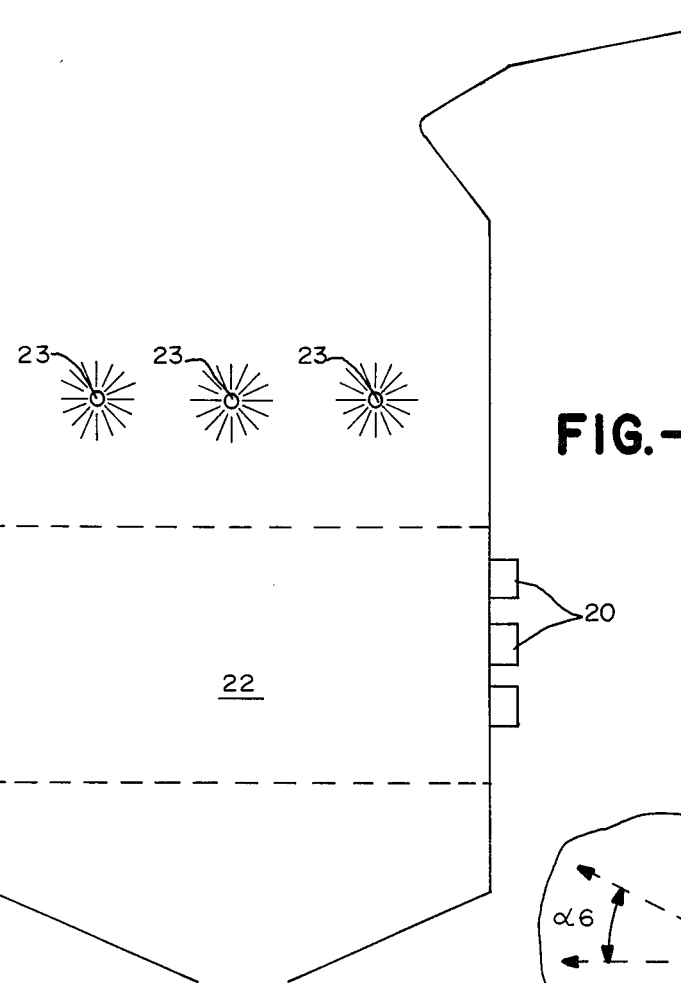
FIG.—2A
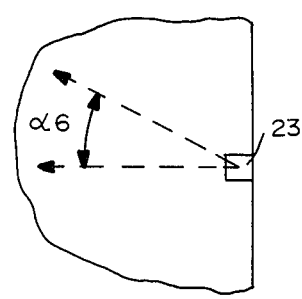
FIG.—2C
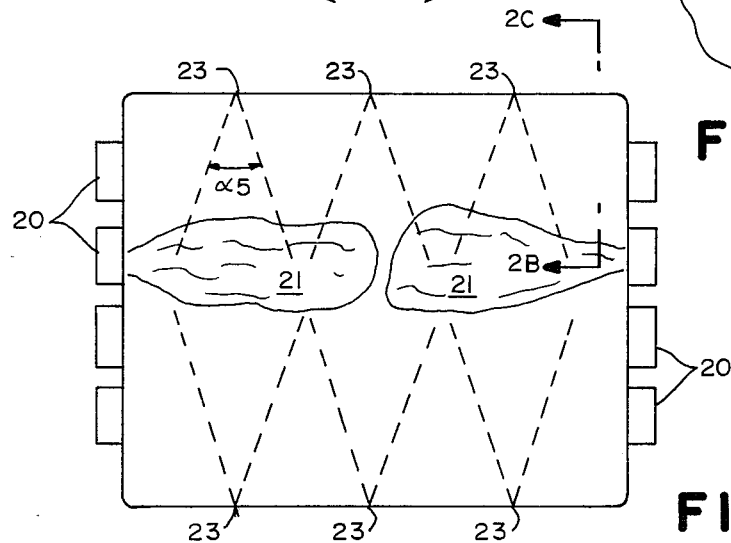
FIG.—2B

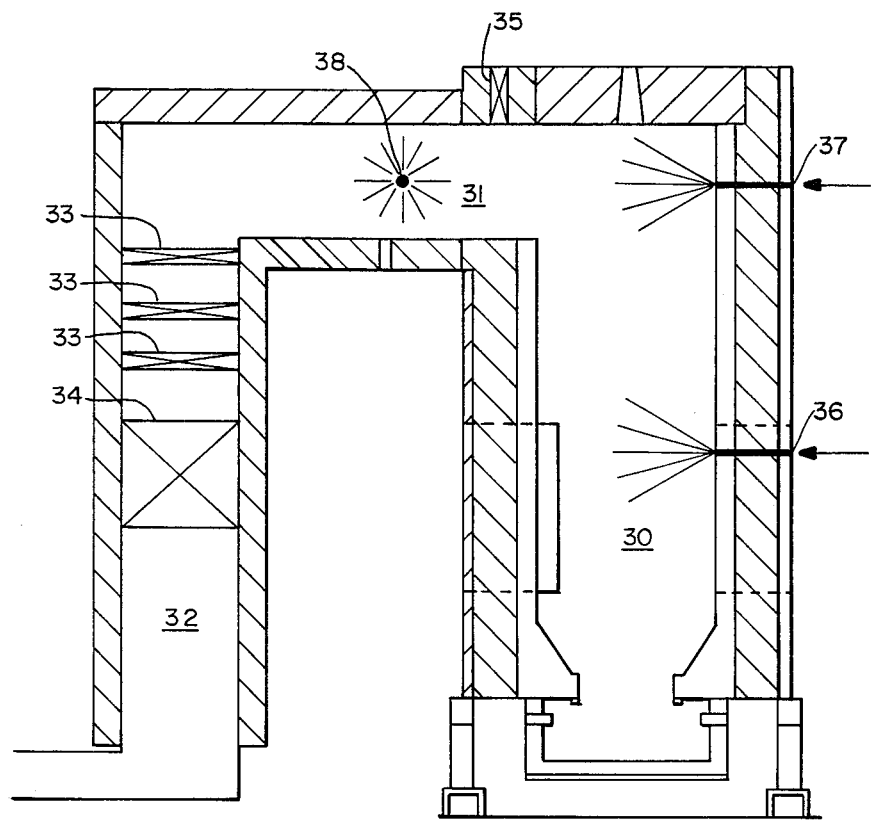
FIG.—3

METHOD FOR REDUCTION OF SULFUR PRODUCTS IN THE EXHAUST GASES OF A COMBUSTION CHAMBER

The present invention is directed to a process for reducing the gaseous sulfur-containing products in the gases resulting from combustion of fossil fuels containing sulfur compounds. In particular, the present invention is directed to reducing the gaseous sulfur-containing products in the gases of a combustion installation by injection of additives outside of the combustion zone.

The use of sulfur-bearing fossil fuels in combustion installation (furnaces, burners, boilers and the like) results in the production of sulfur-containing compounds, in particular, sulfur dioxide. These must be removed from the exhaust gases prior to release into the atmosphere. Various chemical additives are known, including calcium carbonate, magnesium carbonate, limestone, dolomite and calcium hydroxide, which react with sulfur dioxide in a manner which causes the sulfur dioxide to be sorbed on these particulate chemicals. The particulates then may be removed from the exhaust gases by various means, such as by filtration of the flue gas or electrostatic precipitation, and then discarded or recycled. The efficiency of such a sulfur scrubbing process depends in part upon the efficiency of contacting the particulate additives with the exhaust gases from the combustion installation. However, attempts to maximize efficiency have been complicated by the fact that reaction of the additive material with sulfur dioxide occurs within a particular temperature range which is, in the case of calcium carbonate, about 2200° to 1800° F. Since the temperature within the combustion zone of the combustion installation is well above this temperature, i.e., usually 2600° and higher, the contact between the particulate additive (sorbent) and the combustion products must take place outside of the combustion zone to avoid sorbent deactivation. If the dry particulate additive is at any time exposed to a temperature above about 2200° F., significant sorbent deactivation occurs rendering the sorbent chemically useless for the desired sorption reaction. However, if the sorbent is added at a location in the combustion installation where the temperature is too low, the desired reaction will not readily occur.

Therefore, there remains in the art a problem of achieving optimum dispersion of the particulate additive within the gas stream, contacting the particulate additive with the gas stream at the favorable temperatures (2200°–1800° F.), while minimizing or eliminating exposure of the particulates to a temperature above about 2200°.

Various methods are known to attempt to deal with this problem. According to one known method, the additives are introduced in a dry form into the combustion region above the combustion zone with the aid of airjets. See U.S. Pat. No. 3,481,289. However, this subjects the solid additives to the entire temperature spectrum of the flame and furnace, which leads to deactivation of a substantial portion of the additive.

According to another known method, the solid additives are premixed with the fuel (such as coal) before the fuel is introduced into the combustion region. See U.S. Pat. No. 3,746,498. Since the fuel is introduced directly into the combustion zone, this subjects the additives to the extreme temperatures within the combustion zone, thereby leading to deactivation and loss of additive activity.

According to a third known method, the dry additives are injected with the secondary air into the burner around the combustion zone. See U.S. Pat. No. 4,331,638. Again, this leads to substantial deactivation of the additive.

According to a fourth known method, the dry additive is injected below the burner zone (combustion zone), which leads again to sorbent deactivation due to the high temperatures. See U.S. Pat. No. 4,440,100.

It is, therefore, an object of the present invention to provide a method for introducing chemical additives to a combustion chamber which leads not only to improved efficiency of mixing and distribution of the additive with the gas flow, but also prevents sorbent deactivation and allows for sufficient residence time of the particulate matter at the necessary temperature for the binding reaction with sulfur-containing gases to be effectively completed.

This and other objectives and advantages of the present invention will be apparent from the following specification and accompanying drawings.

In the accompanying figures:

FIGS. 1A and 1B illustrate a combustion chamber of a tangentially fired combustion installation showing a preferred direction of injection of additives according to the present invention.

FIGS. 2A, 2B and 2C illustrate a wall fired combustion installation showing a preferred direction of injection of the additives according to the present invention.

FIG. 3 is an illustration of a combustion installation embodying the present invention.

The present invention provides a process for reducing the sulfur content of gas from a combustion installation comprising the step of injecting an aqueous spray composition, which composition provides solid particles after evaporation of water which are capable of reacting with sulfur-containing gases. The aqueous spray composition is injected into a first zone within the combustion installation outside of the combustion zone wherein the temperature within the first zone is such that sorbent deactivation of a dry sorbent would usually occur. In this first zone the aqueous spray composition is dispersed within the combustion products while the water in the spray evaporates and flows with these products to a second zone where the temperature has decreased to the range of about 1800° to 2200° F. A substantial portion of the spray composition is thereby converted to solid particulate matter which, within the second zone, is capable of reacting with the sulfur-containing gases.

In order to ensure optimum distribution of the aqueous spray composition within the first zone, preferably the spray may be directed within the first zone by a stream of air. The airjet stream may be with or without substantial swirl to achieve optimum distribution in the cross-section of the particular combustion chamber.

According to the present invention, an aqueous spray containing an additive which reacts with sulfur-containing gases will be sprayed into a combustion chamber, at a location outside of the combustion (flame) zone, usually above the combustion zone. The exact location of injection of the spray in the upper part of the combustion chamber and the direction of the spray will depend upon the particular conditions and/or design of the combustion chamber, including the residence time of the particles within the combustion chamber. Since the desired chemical reaction to remove the sulfur-containing gases is the reaction of the solid particulate matter with sulfur-containing gases at a temperature in the range of about 2200° to 1800° F., at least three events must take place between the point of injection of the aqueous spray and the locus within the combustion chamber or flue where the solid particulate matter will be in contact with the sulfur-containing gases at the desired temperature. These three events are the following. Firstly, the aqueous droplets must be well dispersed within the conduit containing the sulfur-containing gases so that maximum contact with the sulfur species is obtained. Secondly, the moisture in the aqueous droplets must evaporate. Thirdly, if applicable to the particular additive, certain preparatory chemical reactions must occur to prepare the particulate matter for reaction with gaseous sulfur species. In the case of calcium carbonate (limestone), for example, most of the calcium carbonate particles calcine to lime. Once the water is evaporated, the third process, i.e., the calcination is relatively instantaneous, i.e., on the order of less than about 0.25 second, provided the temperature is above 2000° F. The residence time of the aqueous spray within the combustion chamber therefore will be primarily a function of how long it takes for adequate dispersion and mixing of the particles to occur before the dried particles reach the location of combustion chamber where the bulk gas temperature is below about 2200° F. The additive must be protected from sorbent deactivation while the process of dispersion is taking place. Additives are therefore injected either as a suspension or solution wherein the spray droplets are of a size sufficient to achieve the required residence time while the evaporation process takes place during dispersion of the droplets in the combustion chamber. The droplet size may be readily determined by those of ordinary skill. For example, a typical residence period of water droplets of the size of about 100 microns in diameter containing calcium carbonate particles about 10 to 50 microns in diameter when exposed to a temperature in the range of 1800° to 2500° F. is approximately 2 seconds.

As will be recognized by those of ordinary skill in the art, various parameters may be utilized, depending upon the particular design of the combustion chamber, to optimize or adjust the residence time. This may be necessary due to perturbations in the combustion chamber from change of fuel, combustor load, and the like. For example, the size of the aqueous droplets may be controlled by the pressure in the spray nozzle. Depending upon the characteristics of gas flow within the combustion chamber the angle of injection of the spray into the gas flow may be changed, or a swing atomizer or alternative nozzles may be used in instances where perturbations in the combustion chamber are too great to be compensated by the adjustable range of a single nozzle location.

The additives which may be used which react with gaseous sulfur species include limestone, calcium carbonate (or hydrates), magnesium carbonate (or hydrates) produced by various processes, similar sodium or potassium based components, other alkali and alkaline earth metals, and calcium hydroxide. These are usually provided in the form of limestone (calcium carbonate) dolomite and magnesite ($a.CaCO_3 \times b.MgCO_3$) and hydrated calcium hydroxide ($Ca(OH)_2 \times a.H_2O$). In the case of limestone, dolomite or magnesite, the additive will be in the form of an aqueous slurry and in the case of calcium hydroxide the additive will be in the form of an aqueous solution.

According to the improvements provided by the present invention, the additive may be maintained in a relatively low temperature condition during evaporation of the water, thereby permitting injection of the additives in the upper part of the combustion flame zone while still achieving good mixing and uniform distribution of the additive particle with the gaseous products, and avoiding sorbent deactivation by the high furnace temperature. Furthermore, the present invention provides the ability to adjust the residence time of the particles to the existing temperatures and gas wall conditions within the combustion chamber, thus attaining optimum temperature-time profiles of the additive particles for the complex chemical reactions required to bind sulfur-containing gases. In the case of a slurry, a second disintegration process of the particles is also possible, due to the increase of pressure inside the particle from evaporation of the penetrated water. This in some instances may cause the particle to fragment into smaller particles, thereby increasing the surface area of solids available to contact sulfur-containing gases. Finally, by injecting the additive into the upper part of the combustion chamber outside of the flame zone as a water suspension or solution, the reaction of the additive with melted or sintered ash particulates or inorganic vapors from the ash may be minimized.

Referring to FIG. 1, there is shown a partial side (1A) and plan (1B) view of a conventional tangentially fired combustion chamber. As shown, there is a plurality of inlets 10 located in each of the four corners of the burner. The inlets are directed so that the stream of fuel and primary air 11 enter the combustion chamber at an included angle $\alpha 1$ from the diagonal to produce a flame 12 beyond each corner of the chamber, thereby causing a swirling action. Feeding the flame at each corner is also a stream of secondary air 13, shown introduced through angle $\alpha 2$ which is adjustable throughout the range of angle $\alpha 3$ in such a tangentially fired combustion chamber. The aqueous additive composition will be injected through injectors 15 above the combustor zone 14 at tangential direction at each of the corners of the burner as shown by arrows 15A. The aqueous additive composition will also be injected over an included angle of $\alpha 4$. Optionally a stream of cool air (not shown) will be injected with the additive to ensure that the additive is dispersed over angle $\alpha 4$.

Referring to FIG. 2 there is shown a side (1A), plan (1B), and view (1C) taken along line 2C—2C of FIG. 2B, of a conventional wall fired combustion chamber. In such a combustor the fuel, primary air and secondary air are directed from opposite walls through inlets 20 causing flames 21 within the burner zone 22. As shown, the aqueous additive according to the present invention will be injected above the burner zone 22 through injection ports 23 which distribute the additive transversely through angle $\alpha 5$ and longitudinally through angle $\alpha 6$. Optionally, the spray of aqueous additive will be supported by a stream of cold air (not shown) to assure dispersion over angles $\alpha 5$ and $\alpha 6$.

In order to assist in comprehension of the invention, the following example is described, but is not intended to limit the scope of the present invention.

EXAMPLE

Referring to FIG. 3, a test was performed to determine the effect of sulfur capture by injecting an aqueous suspension of calcium carbonate (limestone) at three different locations in a conventional J-shaped combustion chamber. The pilot scale test furnace consisted of conventional tangentially fired burners with the burner zone 30 and transverse exit flue 31 which, in turn then leads to a downwardly flowing flue 32 accommodating a series of heat exchangers 33 and 34 located within the flue. Heat exchanger 35 is also located in the upper portion of the combustion chamber but outside the flow of the gases. To conduct the test, the pilot scale furnace was fired by introducing into the burner zone 30 a mixture of natural gas plus hydrogen sulfide to simulate the combustion of coal having a sulfur content of approximately 3%. The aqueous additive suspensions were injected in three locations; one at port 36, another at port 37, both of which sprayed as shown horizontally into the flow, and the third at port 38 which sprayed horizontally and transversely to the flow. Each injection port was tested separately and the reduction of sulfur dioxide appearing in the exhaust of the furnace beyond heat exchanger 34 was measured. Results are shown below on Table 1.

TABLE 1

| Run | Additive[a] | Ca/S[b] | Injection Location | $SO_2$ Reduction % (wt.) | $H_2S$ Input (ppm equiv. $SO_2$) |
|---|---|---|---|---|---|
| 1 | Slurry 1:4[c] | 3.52 | 36 | 22.6 | 3875 |
| 2 | Slurry 1:4 | 2.69 | 37 | 72.5 | 3875 |
| 3 | Dry Sorbent (low firing rate)[e] | 2.57 | 36 | 48.3 | 3900 |
| 4 | Dry Sorbent (high firing rate) | 2.57 | 37 | 35.8 | 3975 |
| 5 | Dry Sorbent/High Firing Rate and Equivalent Water Injection[d], | 2.57 | 37 | 38.4 | 3975 |
| 6 | Dry Sorbent (high firing rate) | 2.57 | 36 | 36.0 | 3750 |
| 7 | Slurry 1:3 | 2.95 | 38 | 38.9 | 3600 |
| 8 | Slurry 1:3 Like 7: Moved Injector 2" | 2.97 | 38 | 51.4 | 3600 |
| 9 | Slurry 1:3 Like 8: Moved Injector 1" | 2.97 | 38 | 54.2 | 3600 |
| 10 | Slurry 1:3 Like 8 | 2.77 | 38 | 50.0 | 4400 |
| 11 | Slurry 1:3 Like 8 | 2.77 | 38 | 50.0 | 4400 |
| 12 | Slurry 1:3 Like 8 | 2.77 | 38 | 47.2 | 4400 |

[a]Sorbent used is El Dorado limestone.
[b]Molar ratio based on calcium carbonate injected and sulfur added to fuel.
[c]Weight ratio of calcium carbonate to water.
[d]Four parts water injected through separate nozzle.
[e]High firing rate is nominal four-walled setting. Low-firing rate approximates cooling effect of aqueous solution injection.

As shown from data in Table 1, an unexpected advantage was shown by injecting the aqueous slurry of calcium carbonate (1:4 slurry by weight of calcium carbonate to water) through port 37, that is, a 72.5% reduction of $SO_2$ was observed. Injecting a wet slurry (Run No. 1) too close to the combustion zone through port 36 shows $SO_2$ reduction of less than 30%. To demonstrate that an improvement is in part due to the use of a slurry, runs 3, 4 and 5 were conducted to show that use of a dry sorbent or a dry sorbent accompanied by a water injection did not obtain the results achieved by using the slurry. In runs 7 through 12 through port 38, a variety of injectors and minor adjustments in injector location did not result in the $SO_2$ reduction achieved by using the slurry through port 37, but still resulted in higher $SO_2$ reduction than obtained with dry sorbent alone (Run No. 6).

What is claimed is:

1. A process for reducing the sulfur content of flue gas from a combustion installation comprising the step of injecting an aqueous spray composition, said composition providing a solid capable, after evaporation of water, of reacting with sulfur-containing gases, into a first zone outside of the combustion region of said combustion installation such that said spray composition is exposed to temperatures exceeding about 2200° F.

whereby said spray composition is injected at such a location, velocity, and liquid droplet size that it remains substantially aqueous as it disperses within gases resulting from combustion and flows with said gases while water in said composition evaporates, to a second zone having an upper temperature limit of about 2200° F., thereby providing a substantial portion of said composition as solid particles uniformly mixed with the combustion gases within said second zone, which particles are capable of binding sulfur species in the product of combustion gases, wherein said solid particles comprise calcium carbonate, magnesium carbonate, calcium hydroxide, magnesium hydroxide, or mixtures thereof.

2. A process according to claim 1 wherein said aqueous spray composition is directed within said first zone by a stream of air.

3. A process according to claim 2, wherein said aqueous spray composition comprises a particulate suspension of calcium carbonate.

* * * * *